United States Patent [19]

Tsuruta

[11] 4,169,497
[45] Oct. 2, 1979

[54] METHOD AND DEVICE FOR AUTOMATICALLY INCREASING THE RESTORING FORCE OF A PNEUMATIC TIRE

[76] Inventor: Yasuo Tsuruta, 22-2, 4-chome, Sanno, Ota-ku, Tokyo, Japan

[21] Appl. No.: 801,780

[22] Filed: May 31, 1977

[51] Int. Cl.² .............................................. B60C 23/12
[52] U.S. Cl. ...................................... 152/418; 141/38; 152/339; 152/DIG. 5
[58] Field of Search ................. 152/10, 339, 340, 418, 152/419, DIG. 5, 8, 9; 141/38

[56] References Cited

U.S. PATENT DOCUMENTS

| | | | |
|---|---|---|---|
| 1,035,207 | 8/1912 | Libby | 152/10 |
| 1,185,175 | 5/1916 | Burton | 152/10 |
| 3,033,261 | 5/1962 | Rasmussen | 152/10 |
| 3,329,193 | 7/1967 | Mosebach | 152/340 |
| 3,971,425 | 7/1976 | Tsuruta | 152/10 X |

Primary Examiner—Francis S. Husar
Assistant Examiner—Randolph A. Reese

[57] ABSTRACT

A method and device for automatically increasing the restoring force of a pneumatic tire characterized in that the centrifugal force created by rotation of the tire is caused to act on a liquid within a large diameter chamber of a centrifugal pump and the thus highly pressurized liquid is forced into the tire, so that the deformation of the wheel tread of the tire during operation of a vehicle is rapidly restored.

5 Claims, 4 Drawing Figures

METHOD AND DEVICE FOR AUTOMATICALLY INCREASING THE RESTORING FORCE OF A PNEUMATIC TIRE

BACKGROUND OF THE INVENTION

The present invention relates to a method and device for automatically increasing the restoring force of a pneumatic tire, and more specifically to a method and device for rapidly restoring the deformation made on the wheel tread of the pneumatic tire when a vehicle runs.

Heretofore, when a vehicle is running at a high speed, the speed of the vehicle has to be decreased or the internal pressure within the tire has to be increased to prevent the formation of a "standing wave".

However, when the internal pressure within the tire is increased, poor damping occurs when the vehicle runs at a low speed and the fatigue of the quality of the tire is hastened. In order to solve the drawbacks, regulating the internal pressure of the tire requires stopping the vehicle on all such occasions after or before which the vehicle runs at a high speed.

For solving the above mentioned drawbacks, the applicant developed a method for increasing the internal pressure within a tire in proportion to the running speed of a vehicle, which was granted a patent on July 27, 1976 under U.S. Pat. No. 3,971,425 in the U.S.A. The present invention further improves the invention of U.S. Pat. No. 3,971,425 and has a feature that when the wheel tread of the tire is deformed during the operation of a vehicle, especially at a high speed, such a partial deformation of the wheel tread is rapidly restored, so that the formation of a "standing wave" can be prevented.

SUMMARY OF THE INVENTION

The object of the present invention is to provide a method and a device for automatically increasing the restoring force of a tire to increase the internal pressure of the tire in proportion to the rotational speed of the tire.

Another object of the present invention is to provide a device for automatically increasing the restoring force of a tire to increase the internal pressure of the tire by supplying liquid into the tire.

Still another object of the present invention is to provide a device for increasing the restoring of a tire by incorporating a liquid bag within a tire, driving a centrifugal pump in utilization of the rotational force of the tire and forcibly pressure-supplying the liquid into said liquid bag.

Additional objects of the present invention will become apparent from the following detailed description thereof, and reference to the accompanying drawings in which.

DETAILED DESCRIPTION OF THE INVENTION

Figure 1A:
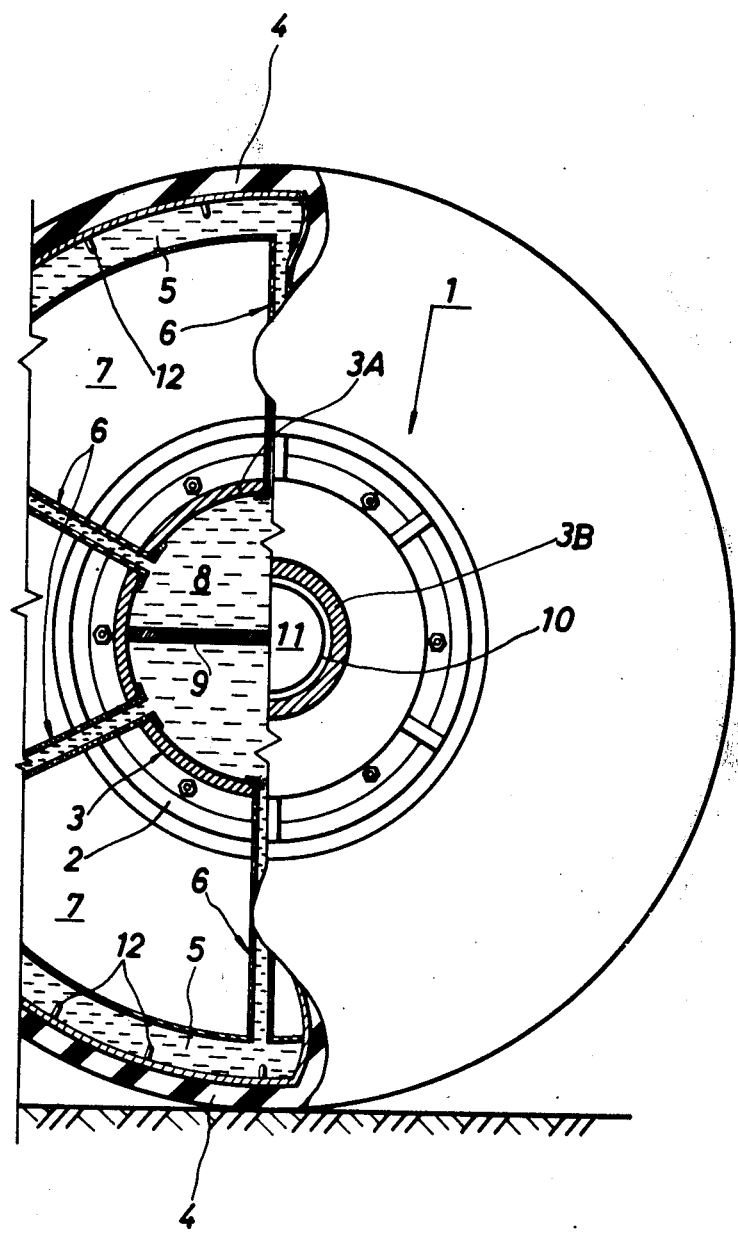
FIGS. 1a and 1b show a state of a vehicle running at high speed while utilizing the device according to the present invention, FIG. 1a being elevational view partly in section of a tire, and FIG. 1b being a longitudinal sectional view thereof.
Figure 1B:
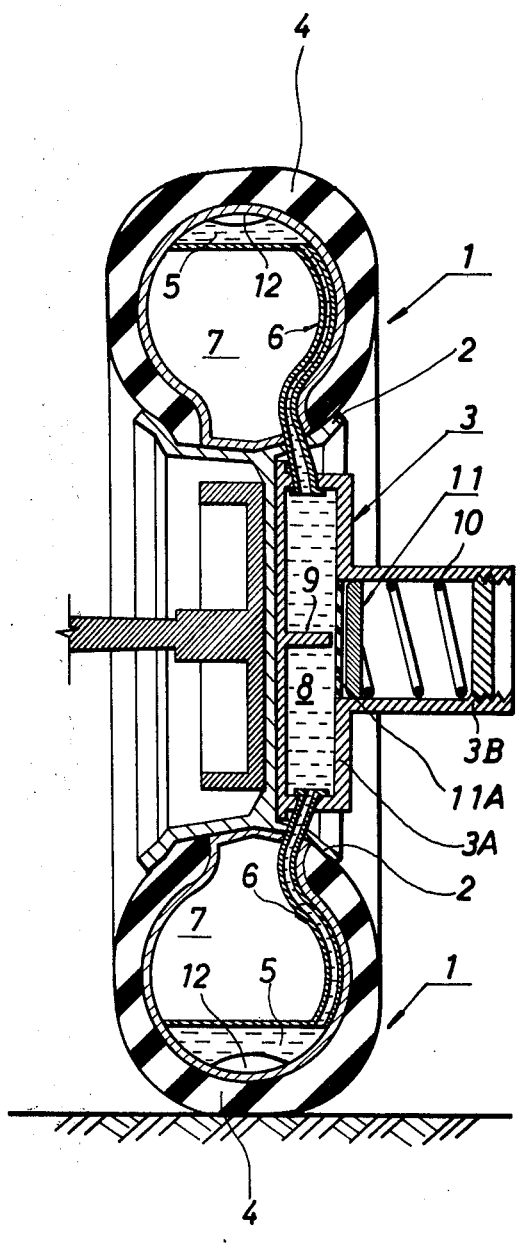

In FIGS. 1a and 1b, a centrifugal pump 3 is installed on the rim 2 of a pneumatic tire 1 which is attached to the body of a vehicle (not shown) and there is annularly provided, within a pneumatic chamber 7, a liquid bag 5 having elasticity along the whole circumference of the internal surface of a tire body.

The liquid bag 5 and the centrifugal pump 3 are communicated through pipes 6 provided on several parts of the peripheral edge of the centrifugal pump 3. The centrifugal pump 3 constitutes a large diameter chamber 3A and a small diameter chamnber 3B installed on the rim 2 of the tire and is coaxial with a rotational axle, within which liquid 8 (it is desirable to use metallic chlorio solution or metallic chloride having a high specific gravity, but it may merely use water) is filled, said small diameter chamber communicating with said large diameter chamber 3A.

A diaphragm 11A of elastic or resilient material separates the space in the small diameter chamber 3B from the inside of the large diameter chamber 3A. A spring 10 housed in the small diameter chamber 3B is supported by a back plate 11, whereby exerting the pressure given to the back plate 11 on the liquid 8 within the large diameter chamber 3A via the diaphragm 11A.

Furthermore, a fan blade 9 diametrically traversing the central part of the large diameter chamber 3A is provided therewithin. Moreover, a plurality of flexible projections 12, 12, . . . for agitating or moving the liquid protrude inside of the annular liquid bag 5 at regular intervals.

Figure 2A:
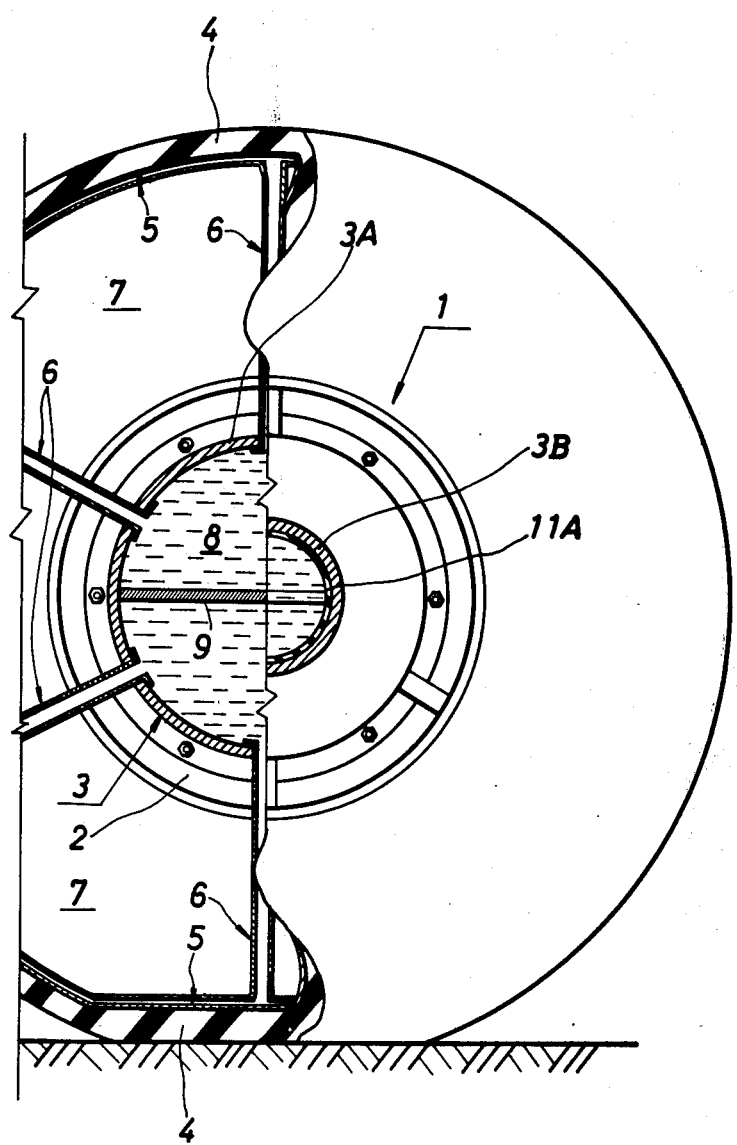
FIGS. 2a and 2b show a tire at rest, FIG. 2a being an elevational view, and FIG. 2b being a longitudinal view thereof.
Figure 2B:
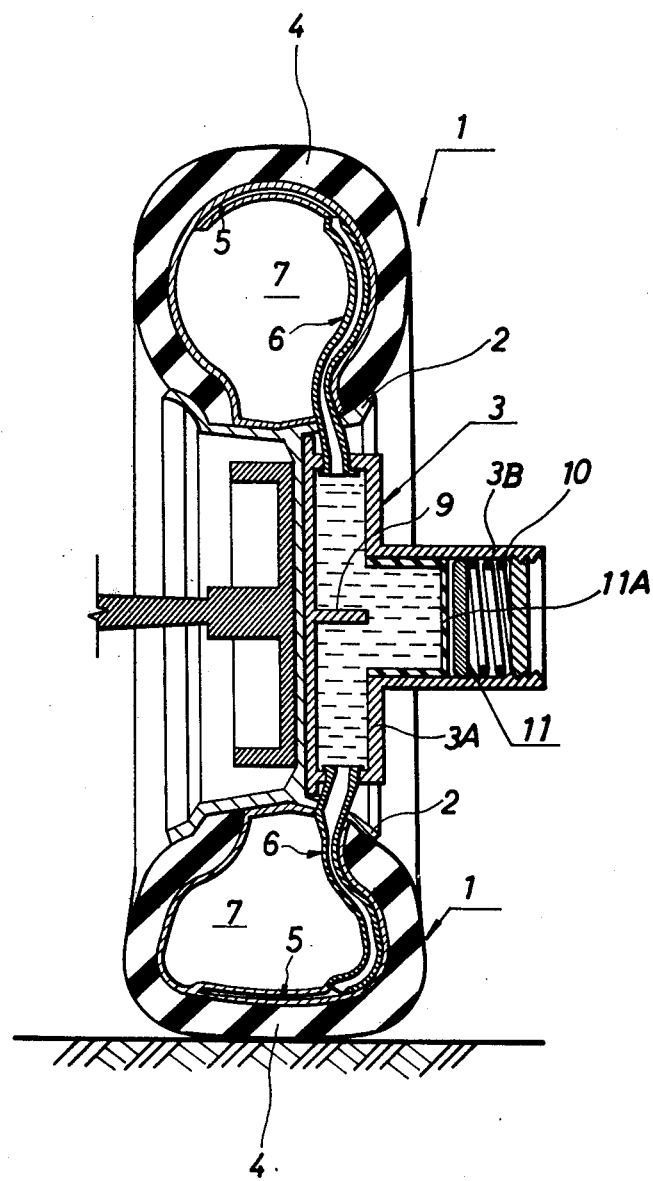

In the embodiments of FIGS. 2a and 2b when a vehicle is at rest, in other words when the tire 1 is not rotating, the liquid bag 5 is pressed against the internal circumference of the tire body 4 of the tire 1 due to the internal pressure from the pneumatic chamber 7 within the tire. The liquid 8 within the liquid bag 5 overcomes the force of the spring 10 and is forced into the large diameter chamber 3A of the centrifugal pump 3, thereby the liquid bag 5 is kept in a shrunken state and the pneumatic chamber 7 of the tire 1 has a predetermined internal pressure.

Thus as the tire 1 rotates when a vehicle runs, the centrifugal force created by the rotation of tire 1 acts on the liquid 8 within the centrifugal pump 3 and the rotation of the fan blade 9 which integrally moves together with the rotation of the tire 1, cause the liquid 8 within the centrifugal pump 3 to rotate.

The centrifugal force overcomes the internal pressure within the pneumatic chamber 7 and then, the liquid 8 is pressurizedly supplied into each part of the liquid bag through each pipe 6, 6, . . . at the same time. The liquid 8 forced into the liquid bag 5 is agitated by the projections 12 provided on the internal surface in the liquid bag 5 and revolves in the liquid bag 5 in proportion to the rotation of the tire 1 while it acts by centrifugal force on the internal surface of the tire body 4 corresponding to the tread portion of the tire 1. By the centrifugal pump 3, the quantity of the liquid which is pressurizedly supplied into the liquid bag 5 increases in proportion to the square of the rotational speed of the tire 1 and moreover, a centrifugal force created in the liquid of unit quantity within the liquid bag 5 increases in proportion to the square of the rotational speed of the tire 1, so that the centrifugal force given to the tire body 4 at the wheel tread portion of the tire 1 by the entire quantity of the liquid supplied into the liquid bag 5 increases in proportion to about the fourth power of the rotational speed of the tire 1.

This can be calculated as follows. In case the device according to the present invention is attached to a tire of 60 cm in diameter, a large diameter chamber 3A of the centrifugal pump 3 is made to 36 cm in diameter; the tire at rest is filled with air to 1.2 kg/cm² (which corresponds to the normal internal pressure of a tire used in a regular passenger car); and carbon tetrachloride ($\delta=1.6$; $-33°$ C. of freezing temperature) with extremely low freezing point and stability is enclosed within the large diameter chamber 3A of the centrifugal pump 3.

Then, the centrifugal force F created in the large diameter chamber 3A of the centrifugal pump 3 is:

$$F = \int_0^{\frac{36}{2}} \delta 2\pi\omega^2\gamma^2 d\gamma$$

$$= 1.6 \times 2\pi\omega^2 \frac{18^3}{3} \simeq 2 \times 10^4 \omega^2 \text{dyn}$$

An angular velocity of the large diameter chamber of the centrifugal pump caused when a vehicle equipped with a tire runs at 100 km/hour is:

$$\omega = \frac{10000000}{60\pi} \pi \times \frac{1}{60 \times 60} \simeq 92.6^{Radian/sec}$$

$$F_{100} \simeq 2 \times 10^4 \times 92.6^2 \simeq 1.72 \times 10^8$$

Accordingly, ejection pressure of the large diameter chamber of the centrifugal pump is:

$$P = \frac{1.72 \times 10^8}{36\pi} \div (9.8 \times 10^5) \simeq 1.6 \text{ kg/cm}^2$$

Thus, the internal pressure is intensified to $1.6-1.2/1.2 \simeq 33\%$ when a vehicle runs at 100 km/hour.

In case a vehicle runs at high speed, therefore, the deformation occuring at the tread portion of the tire in the contact area with the ground is immediately restored to the original position by adding the centrifugal force created in the liquid 8 to the internal pressure in the pneumatic chamber of the tire 1, thereby preventing the formation of a "standing wave".

Conversely, when a vehicle is running at a low speed or is being braked, the rotational speed of the tire 1 decreases or dwindles toward zero, so that water-supplying force for pressurizedly transmitting liquid from the centrifugal pump 3 into the liquid bag 5 becomes weak or zero. Thereby, as illustrated in FIGS. 2a and 2b, the liquid 8 within the liquid bag 5 is pushed back into the centrifugal pump 3 by the internal pressure within the pneumatic chamber 7. Therefore, the liquid bag 5 shrinks and is pressed down to the internal surface of the tire body 4. As a result, the volume of the pneumatic chamber 7 of the tire 1 increases by an amount equal to the quantity of liquid which is pushed back into the large diameter chamber 3A of the centrifugal pump 3, thereby the internal pressure of the pneumatic chamber 7 decreases and the contact area of the tire 1 with the ground increases. Thus, the braking force and traction force increases in proportion to decrease of the restoring force of the tire 1. Further, the strength of the spring 10 can adjust liquid-supplying force which transmits liquid into the liquid bag 5 of the tire 1 from the centrifugal pump 3 in proportion to the speed of rotation of the tire 1.

As mentioned above, since the present invention has such a structure that the liquid bag 5 within the pneumatic chamber 7 of the tire 1 is provided along the internal surface of the tire body, the liquid 8 is supplied into said liquid bag 5 through each pipe 6 by utilization of the centrifugal force created by the rotation of the tire 1; and in addition to the internal pressure of the tire 1, said created centrifugal force of the liquid is caused to act on the internal surface of the wheel tread of the tire whereby it is possible to immediately restore partial deformation occurring on the wheel tread of the tire at high-speed running of a vehicle. Therefore, even though the wheel tread is severely deformed on the road, such a deformation is rapidly restored to its original position so that the formation of "standing wave" and the other troubles can be prevented. Moreover, since the capacity of the liquid is increased by supplying the liquid into the liquid bag 5 and as a result, the internal pressure in the penumatic chamber of the tire increases, it is easy to adjust the internal pressure in conformity with revolutions per minute.

Furthermore, since the liquid 8 within the centrifugal pump 3 is simultaneously forced into the liquid bag 5 through a plurality of pipes 6, 6, ..., the internal pressure of the liquid bag 5 can be raised in conformity with the increase revolutions per minute at short times.

Moreover, according to the present invention a plurality of flexible projections 12, 12, ... are provided on the internal surface of the liquid bag 5, so that the restoration of the tire is facilitated since the liquid flows and rotates within the liquid bag 5 in the rotating direction of the tire by the liquid-agitating operation of the projections 12, 12, ... due to the rotation of the tire 1.

What is claimed is:

1. Apparatus for automatically increasing the restoring force of a pneumatic tire comprising,
   a rim;
   a pneumatic tire on the rim;
   a liquid containing bag extending along an internal surface of the tire in opposed relation to a tread of the tire;
   an air chamber between the rim and the liquid bag;
   a liquid containing chamber on said rim;
   passage means connecting said chamber to said bag;
   said liquid chamber and passage means comprising means for centrifugally forcing liquid into said bag in proportion to the rotational speed of the tire so that liquid forced into said bag increases the pressure in the air chamber of the tire and the centrifugal force of the liquid rapidly restores deformation of the tread.

2. Apparatus according to claim 1 further comprising a plurality of flexible projections within and distributed along the liquid bag to cause liquid in the bag to rotate with the tire.

3. Apparatus according to claim 1 wherein said liquid chamber is of relatively large diameter, and said passage means comprises a plurality of conduits at the circumference of the chamber, said chamber and said conduits comprising centrifugal means for forming said liquid in said bag during rotation of the tire.

4. Apparatus according to claim 1 further comprising a blade in said chamber and fixed to the rim for rotating the liquid during rotation of the tire and rim.

5. A method for automatically increasing the restoring force of a pneumatic tire containing air which comprises the steps of, forcing pressurized liquid into a liquid bag provided along the internal tread surface of a tire body in proportion to the rotation speed of the tire to displace air in the tire and increase the pressure in the tire, and causing the centrifugal force of the liquid supplied to the liquid bag to act on the tread in response to the speed of rotation of the tire.

* * * * *